United States Patent [19]

Stach

[11] 3,920,772

[45] *Nov. 18, 1975

[54] PHOSPHORAMIDATES AND PHOSPHONAMIDATES

[75] Inventor: Leonard J. Stach, Riverside, Ill.

[73] Assignee: Velsicol Chemical Corporation, Chicago, Ill.

[ * ] Notice: The portion of the term of this patent subsequent to Nov. 18, 1992, has been disclaimed.

[22] Filed: Sept. 5, 1972

[21] Appl. No.: 286,488

[52] U.S. Cl. ................................ 260/944; 424/211
[51] Int. Cl.² ...................... C07F 9/24; A01N 9/36
[58] Field of Search .................................. 260/944

[56] References Cited
UNITED STATES PATENTS 3,574,793  4/1971  Richter et al. .................... 260/944

Primary Examiner—Anton H. Sutto
Attorney, Agent, or Firm—Robert J. Schwartz; Dietmar H. Olesch

[57] ABSTRACT

This invention discloses new compounds of the formula

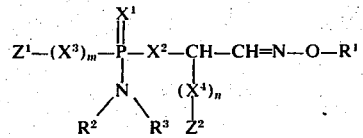

wherein $R^1$ is alkyl; and $R^2$ and $R^3$ are each selected from the group consisting of hydrogen and alkyl; $X^1$, $X^2$, $X^3$ and $X^4$ are independently selected from the group consisting of oxygen and sulfur; m and n are each integers from 0 to 1; $Z^1$ is selected from the group consisting of alkyl, phenyl, alkylphenyl, halophenyl and alkyl-halophenyl; and $Z^2$ is selected from the group consisting of hydrogen and $Z^1$, provided that when $Z^2$ is hydrogen then n is zero. Further disclosed are insecticidal and acaricidal compositions which comprise an inert carrier and a compound of the above description.

5 Claims, No Drawings

PHOSPHORAMIDATES AND PHOSPHONAMIDATES

This invention relates to new compositions of matter and more specifically relates to new compounds of the formula

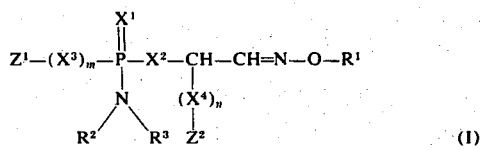

(I)

wherein $R^1$ is alkyl; $R^2$ and $R^3$ are each selected from the group consisting of hydrogen and alkyl; $X^1$, $X^2$, $X^3$ and $X^4$ are independently selected from the group consisting of oxygen and sulfur; m and n are each integers from 0 to 1; $Z^1$ is selected from the group consisting of alkyl, phenyl, alkylphenyl, halophenyl and alkylhalophenyl; and $Z^2$ is selected from the group consisting of hydrogen and $Z^1$, provided that when $Z^2$ is hydrogen then n is zero.

In a preferred embodiment of the present invention $R^1$ is lower alkyl; $R^2$ and $R^3$ are each selected from the group consisting of hydrogen and lower alkyl; $Z^1$ is selected from the group consisting of lower alkyl, phenyl, lower alkylphenyl, chlorophenyl, bromophenyl and lower alkyl-halophenyl; and $Z^2$ is selected from the group consisting of hydrogen and the preferred $Z^1$ provided that when $Z^2$ is hydrogen then n is zero.

The term lower as used herein represents a straight or branched carbon chain of up to ten carbon atoms.

The new compounds of the present invention are unexpectedly useful as insecticides and acaricides. Thus, a further embodiment of the present invention resides in an insecticidal or acaricidal composition containing as the essential active ingredient a compound of the present invention. A still further embodiment of this invention is a method of controlling insects or acarids by applying to the insects or acarids an insecticidal or acaricidal composition of this invention.

The new compounds of the present invention can be readily prepared by reacting a compound of the formula

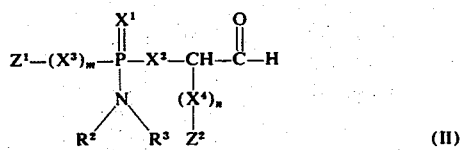

(II)

wherein $R^2$, $R^3$, $X^1$, $X^2$, $X^3$, $X^4$, $Z^1$, $Z^2$, m and n are as heretofore described with a molar or excess amount of an alkoxyamine or alkoxyamine hydrochloride. This reaction can be effected by heating the reactants in an inert organic solvent such as ethanol in the presence of a base such as pyridine which liberates the methoxyamine from its salt, for a period of from about ½ to about 24 hours. The heating can be conveniently carried out at the reflux temperature of the reaction mixture. After the reaction is completed the reaction mixture can be stripped of solvent to yield the desired product as the residue. This residue can be used as such or can be purified by redissolving in ether and washing the ether solution with water to remove the acid acceptor halide. The washed product can then be dried to yield a compound of this invention.

The compounds of formula II can be prepared from an alkali metal phosphoramidate or phosphonamidate of the formula

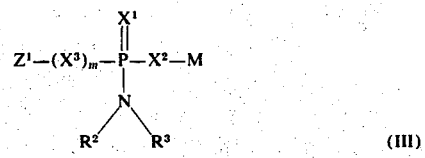

(III)

wherein M is an alkali metal and $R^2$, $R^3$, $X^1$, $X^2$, $X^3$, $Z^1$ and m are as heretofore described by reaction with a compound of the formula

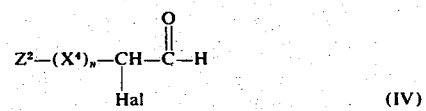

(IV)

wherein Hal designates a halogen, preferably chlorine or bromine, and $Z^2$, $X^4$ and n are as heretofore described. This reaction can be effected by adding the compound of formula IV or a solution of the compound of formula IV in an inert organic solvent such as methyl ethyl ketone, to a solution of the compound of formula III in an inert organic solvent. This reaction mixture can be heated at its reflux temperature, with stirring, for a period of from about 4 to about 48 hours. After the reaction is completed the reaction mixture can be filtered to remove the alkali metal halide which has formed. The desired product can be conveniently recovered as a residue upon evaporation of the solvents from the remaining solution. The product can then be used as such or can be further purified by washing, distillation or other common methods known in the art.

The alkali metal phosphoramidates and phosphonamidates of formula III which are used in the preparation of the compounds of the present invention are known in the art and can be prepared by the methods described by Malatesta and Pizzoti, Chimica e Industria (Milan) 27, 6–10 (1945), and Melnikov and Grapov, Zhur. Vsesayuz Obshchestva in D.I. Mendeleeva, 6, No. 1, 119–120 (1961).

Exemplary compounds of formula IV useful for preparing the compounds of formula II are chloroacetaldehyde, α-chloropropanal, α-bromobutanal, α-chloropentanal, α-chlorohexanal, α-chlorooctanal, α-chlorodecanal, phenyl chloroacetaldehyde, 4-chlorophenyl chloroacetaldehyde, 3,4-dichlorophenyl chloroacetaldehyde, 4-methylphenyl chloroacetaldehyde, 2-methyl-4-chlorophenyl chloroacetaldehyde, 4-bromophenyl chloroacetaldehyde, 4-iodophenyl chloroacetaldehyde, 4-fluorophenyl chloroacetaldehyde, 2-methyl-4,6-dichlorophenyl chloroacetaldehyde, 2,4-diethylphenyl chloroacetaldehyde, 4-propylphenyl chloroacetaldehyde, 3-pentylphenyl chloroacetaldehyde, 4-diethylphenyl chloroacetaldehyde, methoxy chloroacetaldehyde, pentyloxy chloroacetaldehyde, phenoxy chloroacetaldehyde, 2-methyl-4-chlorophenoxy chloroacetaldehyde, 3,4-dibromophenylthio chloroacetaldehyde, methylthio chloroacetaldehyde, decylthio chloroacetaldehyde and the like.

The compounds of the present invention can also be prepared by reacting a compound of formula III with an alkoxyimine of the formula

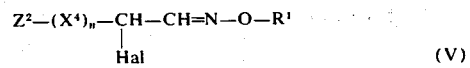

$$Z^2-(X^4)_n-\underset{\underset{Hal}{|}}{CH}-CH=N-O-R^1 \qquad (V)$$

wherein $Z^2$, $X^4$, n, Hal and $R^1$ are as heretofore described. This reaction can be effected by heating the reactants in an inert organic solvent such as methyl ethyl ketone at the reflux temperature of the reaction mixture for a period of from about 4 to about 24 hours. After the reaction is completed the reaction mixture can be filtered to remove the alkali metal halide which has formed. The desired product can be conveniently recovered as a residue upon evaporation of the solvent from the remaining solution. The product can then be used as such or can be further purified by washing, distillation or chromatography if the product is an oil, or by trituration, recrystallization or other common methods well known in the art if the product is a solid.

The alkoxyimine of formula V can be prepared by reacting an aldehyde of formula IV heretofore described, with an alkoxyamine or alkoxyamine hydrochloride. This reaction can be readily effected by combining the reactants in an inert reaction medium such as water, ethanol or the like and stirring the mixture at room temperature for a period of up to about 4 hours. After this time the desired product can be recovered by extraction of the oil phase formed if water was employed as the reaction medium, or upon evaporation of the reaction medium if the product is soluble therein. The recovered product can then be used as such or can be further purified by conventional means.

The preparation of the compounds of the present invention is more specifically illustrates in the following examples.

EXAMPLE 1

Preparation of 1-Chloro-2-Methoxyiminoethane

An aqueous solution of chloroacetaldehyde (12.0 grams; 0.15 mole; 45% concentration), methoxyamine hydrochloride (16.7 grams; 0.20 mole) were charged into a glass reaction flask equipped with a mechanical stirrer. The mixture was stirred at room temperature for a period of about 20 minutes resulting in the formation of an upper oil phase. The oil phase was extracted with ether and the ether solution dried over anhydrous magnesium sulfate. The dried ether solution was then filtered and distilled to yield the desired product 1-chloro-2-methoxyiminoethane as a colorless liquid b.p. 106°–108°C.

EXAMPLE 2

Preparation of S-(2-Methoxyiminoethyl) O-Methyl N,N-Dimethylthiolophosphoramidate Potassium O-methyl N,N-dimethylthiolophosphoramidate (19.3 grams; 0.1 mole), 1-chloro-2-methoxyiminoethane (10.7 grams; 0.1 mole) and methyl ethyl ketone (80 ml) are charged into a glass reaction vessel equipped with a mechanical stirrer and reflux condenser. The reaction mixture is heated at reflux, with stirring, for a period of about 18 hours. After this time the reaction mixture is cooled to room temperature and is filtered. The filtrate is evaporated and the residue dissolved in ether. The ether solution is then washed with water and is dried over anhydrous magnesium sulfate. The dried solution is stripped of solvent to yield the desired product S-(2-methoxyiminoethyl) O-methyl N,N-dimethylthiolophosphoramidate.

EXAMPLE 3

Preparation of S-(2-Methoxyiminoethyl) O-(3,4-dichlorophenyl) N-Isopropylthiolophosphoramidate Potassium O-(3,4-dichlorophenyl) N-isopropylthiolophosphoramidate (31.6 grams; 0.1 mole), 1-chloro-2-methoxyiminoethane (10.7 grams; 0.1 mole) and methyl ethyl ketone (100 ml) are charged into a glass reaction vessel equipped with a mechanical stirrer and reflux condenser. The reaction mixture is heated at reflux, with stirring, for a period of about 16 hours. After this time the reaction mixture is cooled to room temperature and is filtered. The filtrate is evaporated and the residue dissolved in ether. The ether solution is washed with water and is dreied over anhydrous magnesium sulfate. The dried solution is stripped of solvent to yield the desired product S-(2-methoxyiminoethyl) O-(3,4-dichlorophenyl) N-isopropylthiolophosphoramidate as the residue.

EXAMPLE 4

Preparation of 1-Chloro-1-Phenyl-2-Propoxyiminoethane

Phenyl chloroacetaldehyde (30.6 grams; 0.2 mole), propoxyamine hydrochloride (22 grams; 0.25 mole), pyridine (19.8 grams; 0.22 mole) and ethanol (50 ml) are charged into a glass reaction flask equipped with a mechanical stirrer. The mixture is stirred at room temperature for a period of about 2 hours. After this time the reaction mixture is filtered and the filtrate distilled to remove solvent. The residue is taken up in ether, washed and is dried over anhydrous magnesium sulfate. The dried solution is filtered and distilled to yield the desired product 1-chloro-1-phenyl-2-propoxyiminoethane.

EXAMPLE 5

Preparation of S-(1-Phenyl-2-Propoxyiminoethyl) Methyl-N,N-Dimethylthiolophosphonamidate Potassium methyl-N,N-dimethylthiolophosphonamidate (18 grams; 0.1 mole), 1-chloro-1-phenyl-2-propoxyiminoethane (19.0 grams; 0.1 mole) and methyl ethyl ketone (80 ml) are charged into a glass reaction vessel equipped with a mechanical stirrer and reflux condenser. The reaction mixture is heated at reflux, with stirring for a period of about 14 hours. After this time the reaction mixture is cooled to room temperature and is filtered. The filtrate is evaporated and the residue dissolved in ether. The ether solution is washed with water and is dried over anhydrous magnesium sulfate. The dried solution is stripped of solvent to yield the desired product S-(1-phenyl-2-propoxyiminoethyl) methyl-N,N-dimethylthiolophosphonamidate as the residue.

EXAMPLE 6

Preparation of S-Formylmethyl S-(2-Methyl-4-Bromophenyl) N-t-Butyldithiolophosphoramidate A 45 percent aqueous solution of chloroacetaldehyde (7.85 grams; 0.10 mole), potassium S-(2-methyl-4-bromophenyl) N-t-butyldithiolophosphoramidate (39.2 grams; 0.1 mole) and water (30 ml) are charged into a glass reaction vessel equipped with a mechanical stirrer. The reaction mixture is heated slowly, with stirring, at a temperature of about 50°C for a period of about 30 minutes. After this time the reaction mixture is cooled to room temperature and is extracted with ether (100 ml). The ether extract is washed with water and is dried over anhydrous magnesium sulfate. The dried extract is then filtered and evaporated to yield the desired product S-formylmethyl S-(2-methyl-4-bromophenyl) N-t-butyldithiolophosphoramidate as the residue.

EXAMPLE 7

Preparation of S-(2-Pentyloxyiminoethyl) S-(2-Methyl-4-Bromophenyl) N-t-Butyldithiolophosphoramidate S-Formylmethyl S-(2-methyl-4-bromophenyl) N-t-butyldithiolophosphoramidate (21 grams; 0.05 mole), pentyloxyamine hydrochloride (8.37 grams; 0.06 mole), pyridine (4.7 grams; 0.06 mole) and absolute ethanol (40 ml) are charged into a glass reaction vessel equipped with a mechanical stirrer and reflux condenser. The reaction mixture is heated at reflux, with stirring, for a period of about 2 hours. After this time the reaction mixture is subjected to distillation to remove the ethanol and unreacted amine. The residue is dissolved in ether and the ether solution is washed with water. The washed ether solution is then dried over anhydrous magnesium sulfate and filtered. The filtrate is then evaporated to yield the desired product S-(2-pentyloxyiminoethyl) S-(2-methyl-4-bromophenyl) N-t-butyldithiolophosphoramidate as the residue.

Additional compounds within the scope of the present invention can be prepared by the procedure of the foregoing examples. In the following examples are given the essential starting materials for preparing the indicated named compounds.

EXAMPLE 8

Potassium O-(4-isopropylphenyl) N,N-dipentylphosphoramidate + methoxy chloroacetaldehyde + ethoxyamine = O-(1-methoxy-2-ethoxyiminoethyl) O-(4-isopropylphenyl) N,N-dipentylphosphoramidate.

EXAMPLE 9

Potassium O-(3,4-dibromophenyl) N-decylphosphoramidate + methylthio chloroacetaldehyde + methoxyamine hydrochloride = O-(1-methylthio-2-methoxyiminoethyl) O-(3,4-dibromophenyl) N-decylphosphoramidate.

EXAMPLE 10

Potassium S-(2-pentyl-4-iodophenyl) N,N-diethylthiolothionophosphoramidate + 2-methylphenyl chloroacetaldehyde + decyloxyamine = O-[1-(2-methylphenyl)-2-decyloxyiminoethyl] S-(2-pentyl-4-iodophenyl) N,N-diethylthiolothionophosphoramidate.

EXAMPLE 11

Potassium phenyl-N,N-dimethylthiolophosphonamidate + 4-chlorophenyl chloroacetaldehyde + methoxyamine hydrochloride = S-[1-(4-chlorophenyl)-2-methoxyiminoethyl] phenyl-N,N-dimethylthiolophosphonamidate.

EXAMPLE 12

Potassium O-(4-pentylphenyl) N-isopropylthiolophosphoramidate + 3-iodophenyl chloroacetaldehyde + butoxyamine = S-[1-(3-iodophenyl)-2-butoxyiminoethyl] O-(4-pentylphenyl) N-isopropylthiolophosphoramidate.

EXAMPLE 13

Potassium O-(4-fluorophenyl) N,N-dimethylthionophosphoramidate + 3-propyl-5-bromophenoxy chloroacetaldehyde + methoxyamine hydrochloride = O-[1-(3-propyl-5-bromophenoxy)-2-methoxyiminoethyl] O-(4-fluorophenyl) N,N-dimethylthionophosphoramidate.

EXAMPLE 14

Potassium S-(2-decyl-4-chlorophenyl) N,N-dimethyldithiolothionophosphoramidate +α-chlorodecanal + butoxyamine = S-(1-octyl-2-methoxyiminoethyl) S-(2-decyl-4-chlorophenyl) N,N-dimethyldithiolothionophosphoramidate.

Additional compounds within the scope of the present invention which can be prepared by the procedures of the foregoing examples are S-(2-methoxyiminoethyl) O-ethyl N-t-butylthiolophosphoramidate, S-(1-ethyl-2-methoxyiminoethyl) isopropyl-N,N-dimethylthiolophosphonamidate, S-(1-decyl-2-methoxyiminoethyl) hexyl-N,N-diethylthiolophosphonamidate, S-(1-butoxy-2-methoxyiminoethyl) O-decyl N-isopropylthiolothionophosphoramidate, S-(1-pentylthio-2-ethoxyiminoethyl) O-(2,4-dimethylphenyl) N-t-butylthiolophosphoramidate, O-(2-methoxyiminoethyl) O-ethyl N-isopropylphosphoramidate, S-(2-methoxyiminoethyl) S-ethyl N-isopropyldithiolophosphoramidate, S-(2-methoxyiminoethyl) S-ethyl N-isopropyldithiolothionophosphoramidate, S-(2-methoxyiminoethyl) O-ethyl N-t-butylthiolophosphoramidate and the like.

For practical use as insecticides or acaricides, the compounds of this invention are generally incorporated into insecticidal or acaricidal compositions which comprise an inert carrier and an insecticidally or acaricidally toxic amount of such a compound. Such insecticidal or acaricidal compositions, which can also be called formulations, enable the active compound to be applied conveniently to the site of the insect or acarid infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides or acaricides can be dispersed under superatmospheric pressure as aerosols. However, preferred liquid insecticidal or acaricidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the insect or acarid infestation. The emulsifiers most commonly used in these concentrates are nonionic or mixtures of nonionic with anionic surface-active agents.

A typical insecticidal or acaricidal composition according to this invention is illustrated by the following example, in which the quantities are in parts by weight.

EXAMPLE 15

| Preparation of a Dust | |
|---|---|
| Product of Example 2 | 10 |
| Powdered talc | 90 |

The above ingredients are mixed in a mechanical grinder-blender and are ground until a homogeneous, free-flowing dust of the desired particle size is obtained. This dust is suitable for direct application to the site of the insect or acarid infestation.

The compounds of this invention can be applied as insecticides or acaricides in any manner recognized by the art. One method for destroying insects or acarids comprises applying to the locus of the insect or acarid infestation, an insecticidal or acaricidal composition comprising an inert carrier and, as an essential active ingredient, in a quantity which is toxic to said insects or acarids, a compound of the present invention. The concentration of the new compounds of this invention in the insecticidal or acaricidal compositions will vary greatly with the type of formulation and the purpose for which it is designed, but generally the insecticidal or acaricidal compositions will comprise from about 0.05 to about 95 percent by weight of the active compounds of this invention. In a preferred embodiment of this invention, the insecticidal or acaricidal compositions will comprise from about 5 to 75 percent by weight of the active compound. The compositions can also comprise such additional substances as other pesticides, stabilizers, apreaders, deactivators, adhesives, stickers, fertilizers, activators, synergists and the like.

The compounds of the present invention are also useful when combined with other insecticides or acaricides in the compositions heretofore described. These other insecticides or acaricides can comprise from about 5% to about 95% of the active ingredients in the compositions. Use of the combinations of these other insecticides or acaricides with the compounds of the present invention provide insecticidal and/or acaricidal compositions which are more effective in controlling insects or acarids and often provide results unattainable with separate compositions of the individual compounds. The other insecticides or acaricides with which the compounds of this invention can be used in the insecticidal or acaricidal compositions to control insects or acarids include halogenated compounds such as DDT, methoxychlor, TDE, lindane, chlordane, isobenzan, aldrin, dieldrin, heptachlor, endrin, mirex, endosulfon, dicofol and like; organic phosphorus compounds such as TEPP, schradan, ethion, parathion, methyl parathion, EPN, demeton, carbophenothion, phorate, zinophos, diazinon, malathion, mevinphos, dimethoate, DBD, ronnel, oxydemeton-methyl, dicapthon, chlorothion, phosphamidon, naled, fenthion, trichlorofon, DDVP and the like; organic nitrogen compounds such as dinitro-o-cresol, dinitrocyclohexylphenol, DNB, DNP, binapacril, azobenzene, and the like; organic carbamate compounds such as carbaryl, ortho 5353 and the like; organic sulfur compounds such as phenothiazine, phenoxathin, lauryl thiocyanate, [bis(2-thiocyanoethyl)ether], isobornyl thiocyanoacetate and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, paradichlorobenzene and the like.

The compounds of the present invention can also be combined with fungicidal and nematocidal chemical compounds to form pesticidal compositions useful for the control of fungi and in some cases soil nematodes as well as insects or acarids. Typical examples of such fungicidal chemical compounds are ferbam, nabam, zineb, ziram, thiram, chloranil, dichlone, glyodin, cycloheximide, dinocap, maneb, captan, dodine, PCNB, p-dimethylaminobenzene diazo sodium sulfonate and the like; while examples of nematocidal compounds are chloropicrin, O,O-diethyl O-(2,4-dichlorophenyl) phosphorothioate, tetrachlorothiophene, dazomet, dibromochloropropane and the like.

The new compounds of this invention can be used in many ways for the control of insects or acarids. Insecticides or acaricides which are to be used as stomach poisons or protective materials can be applied to the surface on which the insects or acarids feed or travel. Insecticides or acaricides which are to be used as contact poisons or eradicants can be applied directly to the body of the insect or acarid, as a residual treatment to the surface on which the insect or acarid may walk or crawl, or as a fumigant treatment of the air which the insect or acarid breathes. In some cases, the compounds applied to the soil or plant surfaces are taken up by the plant, and the insect or acarids are poisoned systemically.

The above methods of using insecticides are based on the fact that almost all the injury done by insects is a direct or indirect result of their attempts to secure food. Indeed, the large number of destructive insects can be classified broadly on the basis of their feeding habits. Among the insects which can be effectively controlled by the compounds of the present invention are the chewing insects such as the Mexican bean beetle and the southern armyworm; the piercing-sucking insects, such as the pea aphid, the cereal leaf beetle, the housefly, the grape leafhopper, the chinch bug, the lygus bug, the oyster shell scale, the California red scale, the Florida red scale, the soft scale and mosquitoes; the internal feeders, including borers, such as the European corn borer, the peach twig borer and the corn earworm, worms or weevils, such as the codling moth, the alfalfa weevil, the cotton boll weevil, the pink boll worm, the plum curculio, the red banded leaf roller, the melonworm, the cabbage looper and the apple maggot, leaf miners, such as the apple leaf miner, the birch leaf miner and the beet leaf miner, and gall insects such as the wheat joint worm and the grape phylloxera. Insects which attack below the surface of the ground are classified as subterranean insects and include such destructive pests as the wooly apple aphid, the Japanese beetle, the onion maggot and the corn rootworm.

Mites and ticks are not true insects. Many economically important species of mites and ticks can be controlled by the compounds of the present invention such as the red spider mite, the two-spotted mite, the strawberry spider mite, the citrus rust mite, the cattle tick, the poultry mite, the citrus red mite and the European red mite. Chemicals useful for the control of mites are often called miticides, while those useful for the control of both mites and ticks are known specifically as acaricides.

The quantity of active compound of this invention to be used for insect or acarid control will depend on a variety of factors, such as the specific insect involved, intensity of the infestation, weather, type of environment, type of formulation, and the like. For example, the application of only one or two ounces of active chemical per acre may be adequate for control of a light infestation of an insect or acarid under conditions unfavorable for its feeding, while a pound or more of active compound per acre may be required for the control of a heavy infestation of insects or acarids under conditions favorable to their development.

The insecticidal activity of the compounds of the present invention can be demonstrated by experiments carried out for the control of a variety of insects.

In one experiment, designated as the housefly knockdown test, fifty three day old unsexed adult houseflies (*Musca Domestica*) are anesthetized with carbon dioxide gas and placed into a fine mesh cage. The flies are allowed to recover completely from the effects of the carbon dioxide gas and are then sprayed with a formulation containing the indicated concentration of test compound. After 30 minutes the knockdown value of the test compound is determined. Knockdown is considered as an individual fly that is unable to move its body length, and the knockdown value is the percent of down flies based upon the number of down flies in comparison to a control.

The insecticidal activity of the compounds of this invention can further be illustrated in experiments carried out for the control of the pea aphid (*Acyrthosiphon pisum*) by contact. In these experiments ten day old Laxton pea plants contained in small plastic pots are each infested with ten adult pea aphids. The plants and pea aphids are then sprayed with the test compound formulated as an aqueous emulsion of an acetone solution at various concentrations. The infested plants are then placed in a holding chamber maintained at a constant temperature for a period of 48 hours. After this time the mortality of the aphids is determined and rated on a percent basis in comparison to a control.

The systemic activity of the compounds of this invention can be demonstrated in experiments for the systemic control of pea aphids. In these experiments 5 day old Laxton pea plants which have previously been watered with 30 ml of water containing the test compound at the indicated concentration, are infested with ten, newly molted, adult pea aphids. The infested plants are then placed in a holding chamber at 65°F. for a period of 48 hours where they are supplied with water and light as required. After this time the mortality of the pea aphids is determined and rated on a percent basis in comparison to an untreated control.

The acaricidal activity of the compounds of the present invention can be demonstrated in experiments carried out for the control of the two-spotted spider mite (*Tetranychus urticae*).

In one experiment wherein the activity of the compounds of the present invention as contact poisons is determined, the test compounds are formulated at the desired dosages, as aqueous emulsions of acetone solutions and are sprayed onto Henderson bush lima bean plants, each infested with about 100 adult two-spotted spider mites. The treated plants are then placed into a holding room and were supplied with their daily requirement of water and light. After a period of 5 days the mortality of the mites is determined and is rated on a percentage basis in comparison to untreated controls.

In another experiment, the systemic activity of the compounds of the present invention, for the control of the two-spotted spider mite can be demonstrated. In this experiment, 5 day old Henderson bush lima bean plants are each watered with 30 ml of a formulation containing the test compound at the desired concentration. After a period 48 hours the plants are infested with two-spotted spider mites and are placed into a holding room and supplied with water and light as required. After a period of 5 days the mortality of the mites is determined and rated on a percent basis in comparison to untreated controls.

I claim:

1. A compound of the formula

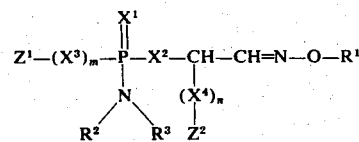

wherein $R^1$ is lower alkyl; $R^2$ and $R^3$ are each selected from the group consisting of hydrogen and lower alkyl; $X^1$, $X^2$, $X^3$ and $X^4$ are independently selected from the group consisting of oxygen and sulfur; $m$ is an integer from 0 to 1, $n$ is zero; $Z^1$ is selected from the group consisting of lower alkyl, phenyl, lower alkylphenyl, halophenyl and lower alkyl-halophenyl; and $Z^2$ is hydrogen.

2. The compound of claim 1, S-(2-methoxyiminoethyl) O-methyl N,N-dimethylthiolophosphoramidate.

3. The compound of claim 1, S-(2-methoxyiminoethyl) O-(3,4-dichlorophenyl) N-isopropylthiolophosphoramidate.

4. The compound of claim 1, O-(2-methoxyiminoethyl) O-ethyl N-isopropylphosphoramidate.

5. The compound of claim 1, S-(2-methoxyiminoethyl) O-ethyl N-isopropylthiolothionophosphoramidate.

* * * * *